C. E. DAVIS.
LOCOMOTIVE.
APPLICATION FILED APR. 24, 1909.
Reissued Mar. 8, 1910.
13,092.
4 SHEETS—SHEET 1.
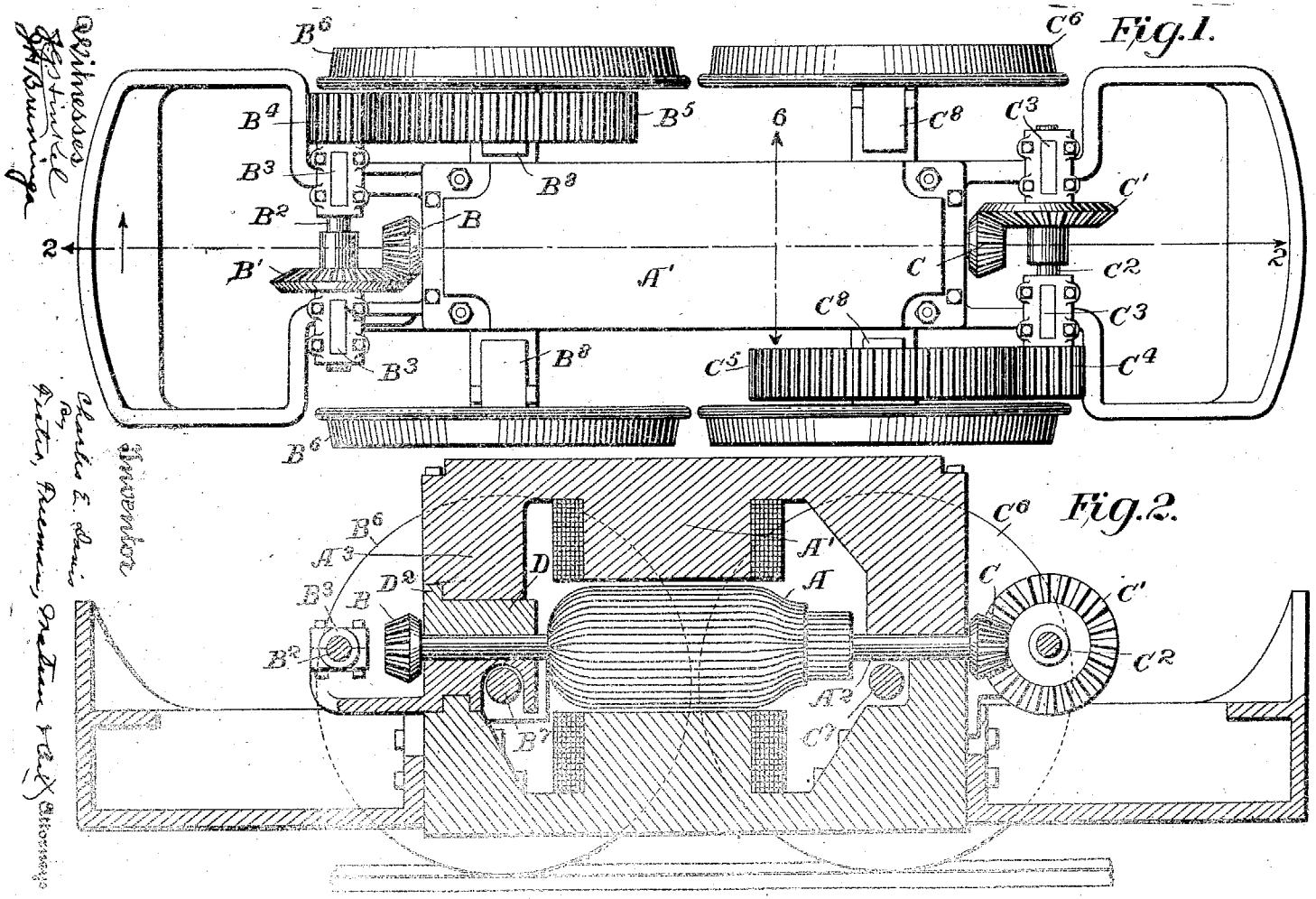

C. E. DAVIS.

LOCOMOTIVE.

APPLICATION FILED APR. 24, 1909.

Reissued Mar. 8, 1910.

13,092.

4 SHEETS—SHEET

Witnesses

J. G. Stinkel

J. H. Bruninga

Inventor

Charles E. Davis

By

Foster, Freeman, Watson & Coit

Attorneys

C. E. DAVIS.
LOCOMOTIVE.
APPLICATION FILED APR. 24, 1909.
Reissued Mar. 8, 1910.
13,092.
4 SHEETS—SHEET 3.
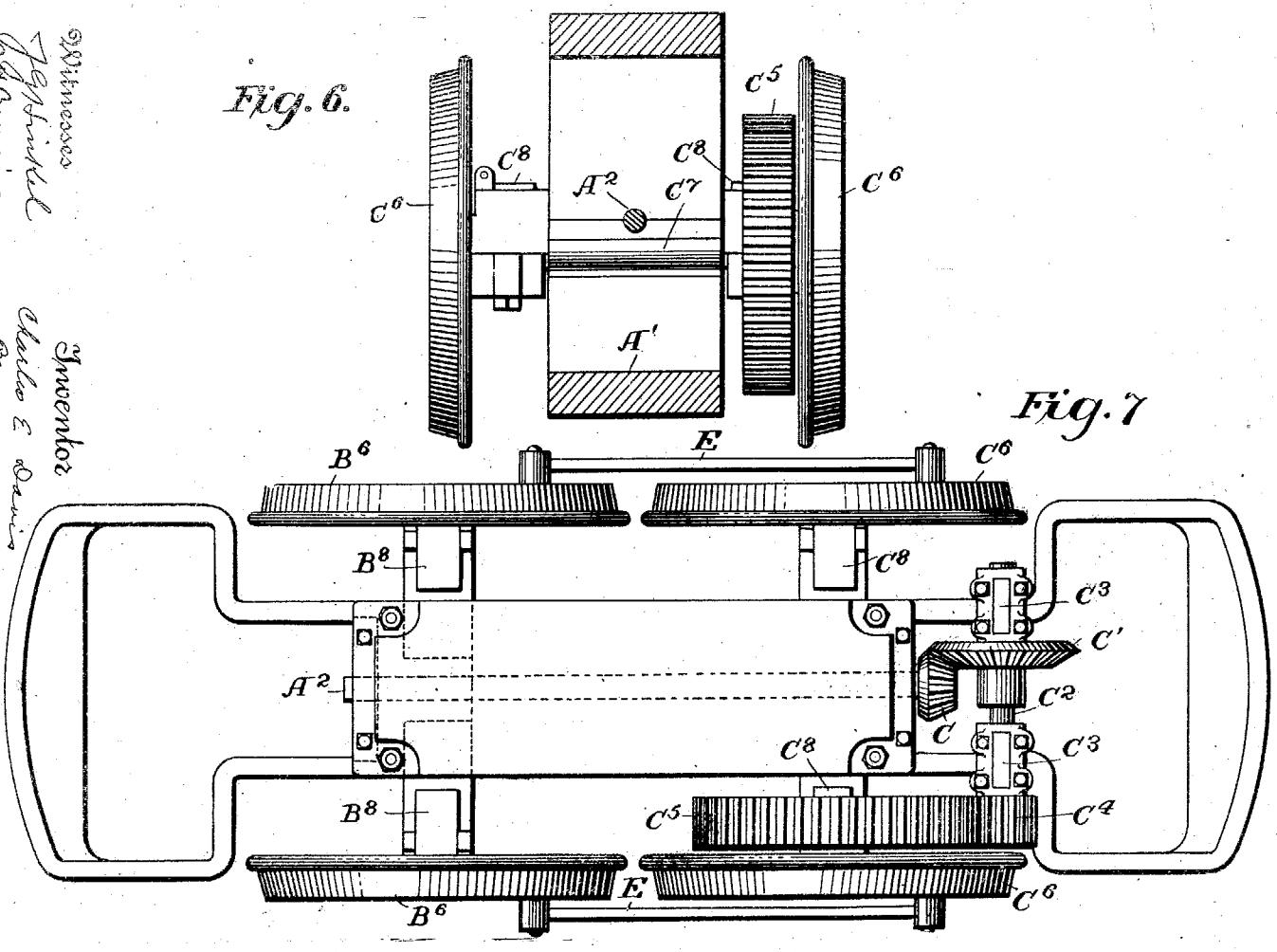
Witnesses
J. G. Hinkel
J. A. Bruninga
Inventor
Charles E. Davis
By
Foster, Freeman, Watson & Coit
Attorneys C. E. DAVIS.
LOCOMOTIVE.
APPLICATION FILED APR. 24, 1909.
Reissued Mar. 8, 1910.
13,092.
4 SHEETS—SHEET 4.
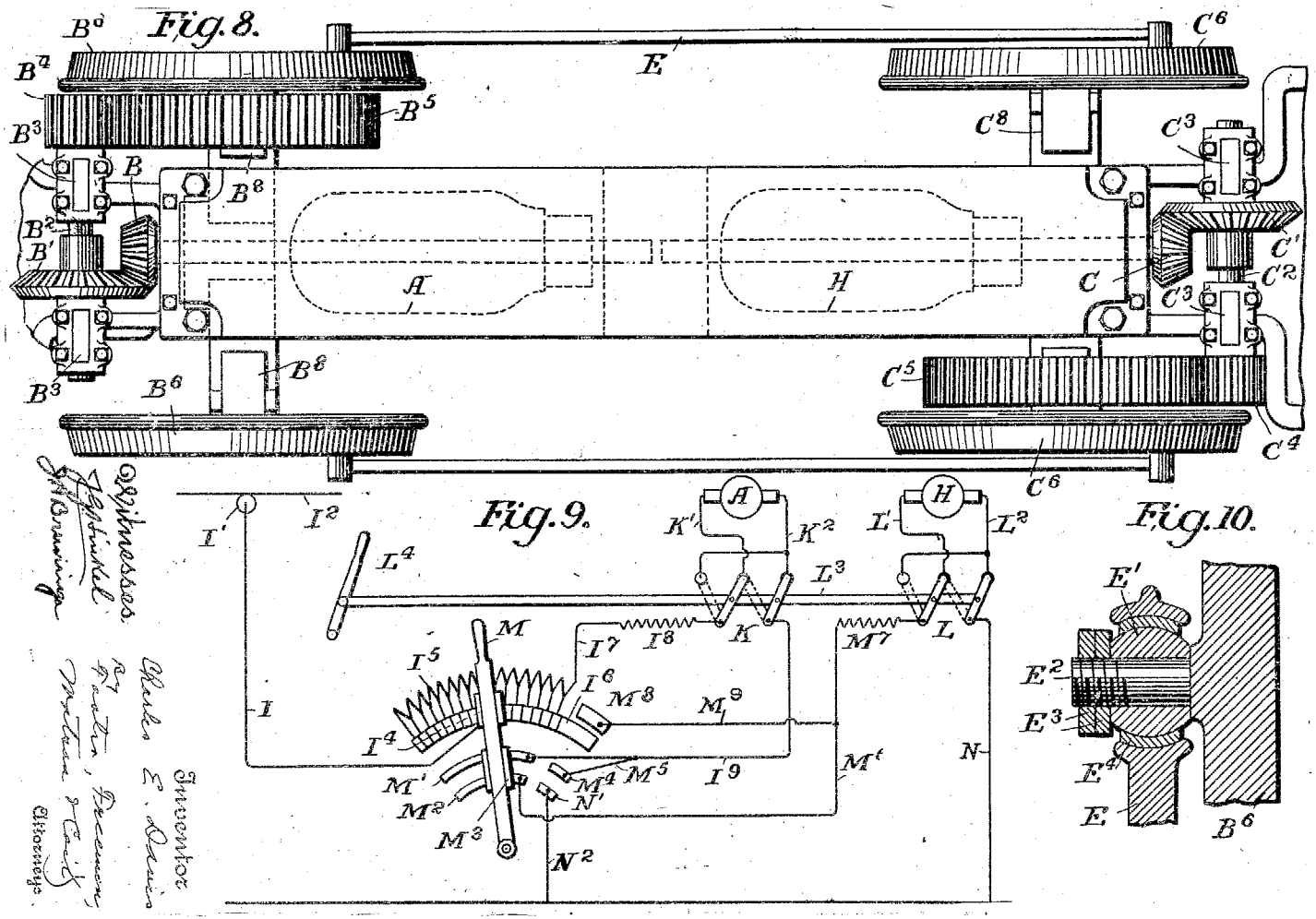
Witnesses.
J. J. Stickel
J. A. Brewinga
Inventor
Charles E. Davis
By Foster, Freeman, Watson & Coit
Attorneys.

UNITED STATES PATENT OFFICE.

CHARLES E. DAVIS, OF CHICAGO, ILLINOIS, ASSIGNOR, BY MESNE ASSIGNMENTS, TO GOODMAN MANUFACTURING COMPANY, OF CHICAGO, ILLINOIS, A CORPORATION OF ILLINOIS.

LOCOMOTIVE.

13,092. Specification of Reissued Letters Patent. Reissued Mar. 8, 1910.

Original No. 645,553, dated March 20, 1900, Serial No. 513,015. Application for reissue filed April 24, 1909. Serial No. 492,093.

*To all whom it may concern:*

Be it known that I, CHARLES E. DAVIS, a citizen of the United States, residing at Chicago, in the county of Cook and State of Illinois, have invented certain new and useful Improvements in Locomotives, of which the following is a specification.

Figure 3:
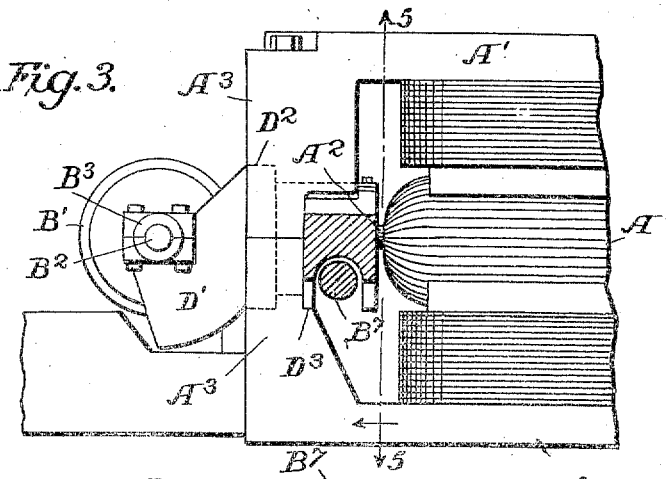
Figure 4:
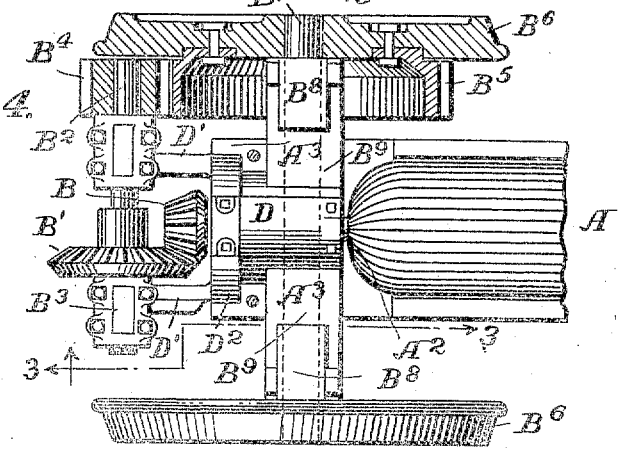
Figure 5:
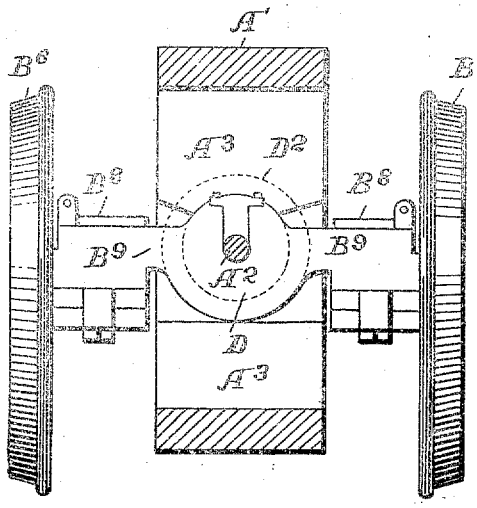

My invention relates to electric locomotives, or locomotive trucks, and has for its object to produce an improved locomotive, of which the following is a description, reference being had to the accompanying drawings, wherein:

Figure 1 is a plan view of motor and associated parts; Fig. 2 is a section on line 2—2, Fig. 1; Fig. 3 is a section on line 3—3, Fig. 4; Fig. 4 is a detailed plan view, with parts removed, of the swiveled axle; Fig. 5 is a section on line 5—5, Fig. 3; Fig. 6 is a section on line 6—6, Fig. 1; Fig. 7 is a plan view of a modification; Fig. 8 is a plan view of a second modification; Fig. 9 is a diagrammatic view of the electrical connections of Fig. 8; Fig. 10 is a detail.

Like letters refer to like parts throughout the several figures.

I have shown in the accompanying drawings a locomotive to be used for hauling. It is often the case that the track upon which the locomotive must run is uneven, and hence only three of the driving-wheels, as such locomotives are now constructed, will sustain the load upon the rails at one time. When this occurs, the tractive power of the locomotive is decreased and other evils result. In my locomotive these evils are avoided by constructing the axle of one pair of drivers so that it is free to move with relation to the remaining parts of the locomotive including the other axle.

As shown in Figs. 1 and 2, A is the armature, and A′ the field-magnets, of the electric motor that drives the locomotive. Keyed to each end of the armature-shaft $A^2$ are the bevel-pinions B and C, which mesh with the bevel-gears B′ and C′ on the shafts $B^2$, $C^2$. These shafts work in the bearings $B^3$, $C^3$ and are provided at one end with the pinions $B^4$, $C^4$, which mesh with the gears $B^5$, $C^5$, rigidly attached to the driving wheels $B^6$, $C^6$ on the axles $B^7$, $C^7$. (See Fig. 4). $B^8$, $C^8$ are the bearings in which said axles work. The bearings $B^8$ of the axle $B^7$ are attached to the ends of the arms $B^9$, $B^9$, (see Figs. 4 and 5) rigidly connected with and projecting from the sides of the cylindrical part D, which acts as a bearing for the armature-shaft $A^2$. Projecting from the ends of the cylinder D are the arms D′, D′, to which are fastened the bearings $B^3$ of the shaft $B^2$. Said cylinder is provided with the flange $D^2$. The projecting ends $A^3$ of the field-magnets A′ form a bearing in which the cylinder D may rock. It will be seen that by this construction the cylinder D, axle $B^7$, driving-wheels $B^6$, gear-wheel $B^5$, pinion $B^4$, shaft $B^2$, and bevel-gear B′, may rock about the armature-shaft $A^2$ in the bearing provided by the projecting parts $A^3$, $A^3$ of the pole-pieces A′ without affecting the engagement between the pinion B and bevel-gear B′, and hence said driving-wheels may adjust themselves to the irregularities of the track, so that all four driving-wheels will be on the track at all times. The bearings $C^8$ of the axle $C^7$ are rigidly attached to the frame of the motor in any convenient way.

I have shown in Fig. 7 a modification in which the armature-shaft $A^2$ has only one pinion C, which by means of the intervening mechanism drives the wheels $C^6$. The connection between the axles in such case consists of the wheels $B^6$ and connecting rods E, E.

In Fig. 8 I have shown a modification where the motor is a compound one with two armatures A, H, on separate shafts. The armature A drives the wheels $B^6$ on the swiveled shaft and the armature H the wheels $C^6$ on the stationary shaft. The driving wheels are connected by the rods E, E.

When two motors are used, I arrange the circuits so that when the motors are first started they will be in series so as to get a greater power with slower speed. After the locomotive is in motion I change the circuits, so that the motors will be in multiple and the speed increased. Fig. 9 shows a diagram of these circuits. I is the wire leading from the trolley-wheel I′ in contact with the trolley-wire $I^2$ to the contact-plate $I^4$, attached to but insulated from the movable arm M. $I^5$ is the resistance-wire cut in or out of circuit by the movement of the arm M along the arc $I^6$. The wire $I^7$ connects one end of said resistance-wire with the field-coils $I^8$. Said field-coils are connected to one pole of the reversing-switch K, which is connected to armature A by wire K′. Armature A is connected to the other pole of the reversing-switch K by wire $K^2$. The wire $I^9$ connects said switch with the conductor M′, which is connected to the conductor or plate $M^2$ by the plate $M^3$ on the arm M. Wire $I^9$ is connected to the short conductor $M^4$ by wire $M^5$. Conductor $M^2$ is connected by wire $M^6$ to field-magnet coils $M^7$. Wire $M^6$ is connected with conductor $M^8$ by wire $M^9$. Said field-coils are connected to one pole of the reversing-switch L, which is connected by wire L′ to armature H. The wire $L^2$ connects said armature with the other pole of switch L, which is connected to the ground by wire N. The short conductor N′ is connected to the ground by wire $N^2$. The reversing-switches K and L are connected by the rod $L^3$ and are controlled by the lever or handle $L^4$.

Fig. 10 is a detailed view showing the manner in which the connecting-rods are attached to the cranks, in this instance consisting in part of the driving-wheels. A ball E′ surrounds one or more of the crank pins $E^2$ and is held in place in any suitable manner, as by the nuts $E^3$, $E^3$. The box on the end of the connecting-rod is lined with the bearing metal $E^4$. This construction allows of a universal motion, which is necessary on account of the relative motion between the axles.

I have described my locomotive as shown in the drawings; but it is evident that these several features may be varied in form, construction, and arrangement without departing from the spirit of my invention, for instance, any device which will allow the axles freedom of relative angular movement, while preserving their distance apart and without altering their relation to the armature or equivalent driving shaft, may be employed in lieu of the cylinder D and attached parts; again it is evident that other means for securing the necessary lost motion in the connecting rods E, E may be used, and I therefore do not wish to be limited to the construction shown.

The use and operation of my invention are as follows: As shown in Figs. 1 and 2, the motion of armature A is communicated to the driving-wheels $B^6$ by pinion B, bevel-gear B′, shaft $B^2$, pinion $B^4$, and gear-wheel $B^5$. The wheels $C^6$ are drivein in the same manner by pinion C, &c. Tracks upon which the electric locomotive runs are often very uneven, so that locomotives as generally constructed have at times only three driving-wheels sustaining the load upon the track at once. This causes, among other evils, a decrease in the tractive power. If when the locomotive is constructed in accordance with the principle herein described the track is uneven, the axle of the wheels $B^6$ and accompanying parts will move, so as to keep the weight upon each of the four of the wheels independent of such unevenness of the track practically constant. Since these parts rotate or rock about the motor-shaft $A^2$, the pinion B and bevel-gear B′ will always be in engagement and the driving power will not be affected.

In the modification shown in Fig. 7 the stationary axle of the driving-wheels $C^6$ is driven by the motor, the motion being communicated to the drivers on the pivoted or movable axle by the connecting-rods E, E.

In Fig. 8 I have shown two motors, one to each pair of driving-wheels. In starting the locomotive the motors are coupled in series, and after the machine is in motion are changed so as to be in multiple. The circuits when the motors are first started up will be as follows, Fig. 9: from trolley-wire $I^2$ through wire I to plate $I^4$, thence through resistance $I^5$, wire $I^7$, field-coils $I^8$, wire K′, armature A, wires $K^2$ and $I^9$ to conductor M′, thence by plate $M^3$ to conductor $M^2$, thence by wire $M^6$, field-coils $M^7$, wire L′, armature H, wires $L^2$ and N to ground. After the motors have reached the required speed the arm M is moved until plates $I^4$ and $M^3$ come in contact with conductors $M^8$, $M^4$, and N′. When this occurs, the resistance $I^5$ is all cut out and the motors are in multiple, the circuits being traced as follows: from trolley-wire $I^2$ through wire I, plate $I^4$, wire $I^7$, field-coil $I^8$, wire K′, armature A, wire $K^2$, wire $I^9$, wire $M^5$, conductor $M^4$, plate $M^3$, conductor N′, and wire $N^2$ to ground. The current divides at plate $I^4$, part going by way of conductor $M^8$, wire $M^9$, wire $M^6$, field-coils $M^7$, wire L′, armature H, and wires $L^2$ and N to ground.

When it is desired to reverse the motors, the switches K and L are moved in any suitable manner, as by means of the handle $L^4$ and rod $L^3$, until they take the position shown in dotted lines. When in this position, the current through the armatures is reversed, and hence the motors will be reversed.

I claim:

1. A locomotive comprising an armature and shaft, a fixed axle and a swiveled axle, said swiveled axle working in bearings rigidly attached to a cylindrical piece which acts as a bearing for one end of the armature shaft and which moves with said axle substantially as described.

2. A locomotive comprising a swiveled axle rigidly connected to a cylindrical piece through which the armature shaft passes, a shaft supported by arms projecting from said cylindrical piece, a bevel gear and pinion on said shaft and the latter engaging a gear wheel connected with the swiveled axle, whereby the motion of the armature shaft is communicated to the swiveled axle in all its different positions, substantially as described.

3. A locomotive, comprising a fixed axle and an axle movable in a vertical plane, a dynamo-electric machine having an armature shaft operatively connected with said movable axle, said movable axle being at an angle with said armature shaft and adapted to move around said armature shaft as a center.

4. A locomotive comprising two axles, free so as to move with relation to each other without varying the horizontal distance between the axles, two motors with series-multiple connections to the source of electrical supply, power driving connections from each motor to the axles of the locomotive, and mechanical couplings between the axles.

5. A locomotive comprising a frame, four wheels, the axles of the wheels being mounted so as to move with relation to each other in a plane substantially perpendicular to said frame without varying the horizontal distance between the axles, side couplings between the different pairs of wheels comprising a connecting rod organized to permit the said relative movement of the axles.

6. In a two axle locomotive truck, means for allowing freedom of motion of the axles vertically with reference to each other without altering the horizontal distance between them, and electric motor driving one of the axles and driving connections between the axles, consisting of connecting rods working upon crank pins connected with the axles, and universal joints between the rod and one of the pins to allow for said freedom of motion between the axles.

7. A locomotive comprising axles free for relative movement in vertical planes and also from parallelism, an electric motor having its rotary part connected with one of such axles for positive drive of such axle, the connection being such as to permit the freedom of movement of the axle with reference to the motor without interrupting such connection and connecting rods between the axles, the connection being such as to permit the said relative movement of the axles.

8. A locomotive comprising axles free for relative movement in vertical planes and from parallelism, each axle supplied with a pair of driving wheels, an electric motor having its rotating part coupled with one of such pair of wheels and axle, and connecting rods between the various pairs of wheels, the connections being such as to permit of freedom of movement between the axles and also of the first named axle with reference to said rotating part of the motor.

In testimony whereof I affix my signature in presence of two witnesses.

CHARLES E. DAVIS.

Witnesses:
CHARLES A. PRATT,
B. H. HALLEY.